(12) United States Patent  (10) Patent No.: US 8,478,063 B2
Toyoda et al.  (45) Date of Patent: *Jul. 2, 2013

(54) IMAGE PROCESSING APPARATUS AND IMAGE PROCESSING METHOD

(75) Inventors: Yuushi Toyoda, Kawasaki (JP); Masayoshi Shimizu, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 586 days.

This patent is subject to a terminal disclaimer.

(21) Appl. No.: 12/772,729

(22) Filed: May 3, 2010

(65) Prior Publication Data

US 2010/0208992 A1   Aug. 19, 2010

Related U.S. Application Data

(63) Continuation of application No. PCT/JP2007/073595, filed on Dec. 6, 2007.

(51) Int. Cl.
*G06K 9/40* (2006.01)
*G06K 9/00* (2006.01)

(52) U.S. Cl.
USPC .......................... 382/264; 382/167; 382/274

(58) Field of Classification Search
None
See application file for complete search history.

(56) References Cited

U.S. PATENT DOCUMENTS

| 8,213,736 B2 * | 7/2012 | Toyoda et al. ............... 382/264 |
| 2003/0016306 A1 | 1/2003 | Ogata et al. |
| 2004/0175054 A1 * | 9/2004 | Ogata et al. ................... 382/274 |

FOREIGN PATENT DOCUMENTS

| JP | A 2000-105815 | 4/2000 |
| JP | A 2003-8898 | 1/2003 |
| JP | 2004-172726 | 6/2004 |
| JP | A 2005-328277 | 11/2005 |
| WO | WO 2007/129367 | 11/2007 |

* cited by examiner

*Primary Examiner* — Amir Alavi
*Assistant Examiner* — Kenny Cese
(74) *Attorney, Agent, or Firm* — Greer, Burns & Crain, Ltd.

(57) ABSTRACT

An image processing apparatus sets the pixels of an input image as process target pixels by using low pass filters (LPF #1_1 to LPF #1_n) each having different level value ranges, computes the average values of the pixels included in the level value ranges from the pixels of the input image including process target pixels included within the filter sizes of the low pass filters, generates level-value-limited smoothed images #1 limited by the level values, generates level-value-limited smoothed images #2 by using low pass filters (LPF #2_1 to LPF #2_n) each having level value ranges or filter sizes different from those of LPF #1_1 to LPF #1_n, selects either of the level-value-limited smoothed images #1 or the level-value-limited smoothed images #2 on the basis of the process target pixels and level values different from the level values utilized by LPFs, synthesizes the selected level-value-limited smoothed images, and generates a smoothed image.

7 Claims, 10 Drawing Sheets

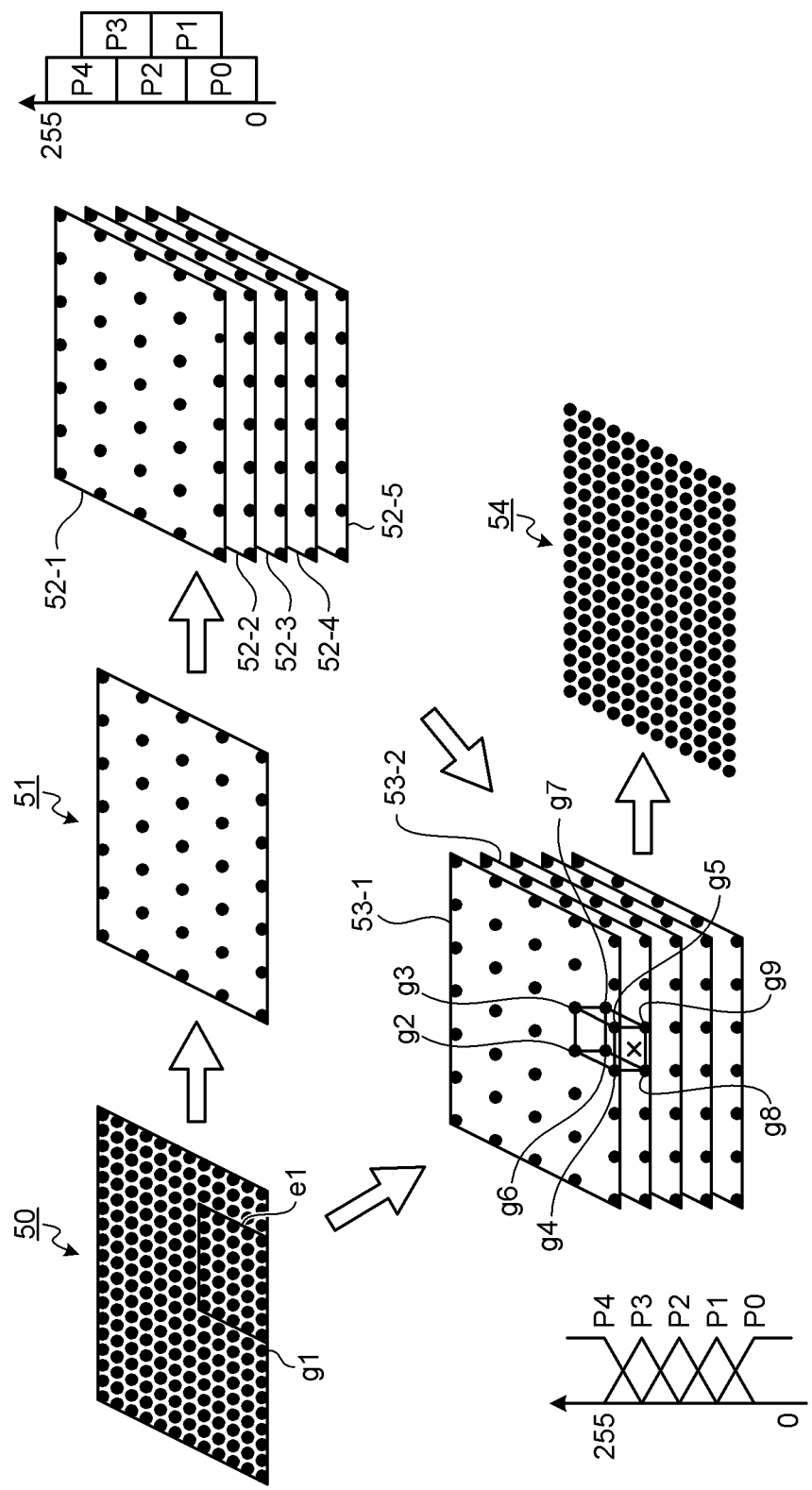

IMAGE PROCESSING APPARATUS AND IMAGE PROCESSING METHOD

CROSS-REFERENCE TO RELATED APPLICATION(S)

This application is a continuation of International Application No. PCT/JP2007/073595, filed on Dec. 6, 2007, the entire contents of which are incorporated herein by reference.

FIELD

The embodiments discussed herein are directed to an image processing apparatus and an image processing method for generating a smoothed image that is obtained by blurring an input image.

BACKGROUND

When a smoothed image obtained by blurring an image is generated in digital image processing, the average value of the level values of pixels within a filter size is conventionally used as the signal level of a pixel of interest by using a low-pass filter. However, when using a low-pass filter, there is a problem in that an edge portion that has a large difference between level values also becomes dim because the average value of the level values of the pixels within a filter size is used as the signal level of a pixel of interest. Specifically, as illustrated in FIG. 7, when using a low-pass filter, a gradient for an edge portion having a large brightness difference in a process target image that is indicated by the solid line gets dull in the case of a low-pass filter image (LPF image in the present drawing) output from the low-pass filter that is indicated by the dotted line, and thus it is impossible to hold the edge portion.

To solve such a problem, various conventional technologies for accurately saving the edge portion of an image and blurring the other portion have been considered. A technology related to a face image processing apparatus (image processing apparatus) that uses an epsilon filter has been known as disclosed in, for example, Japanese Laid-open Patent Publication No. 2000-105815.

Specifically, as illustrated in FIG. 8, the face image processing apparatus uses a pixel located at an image coordinates (m, n) as a pixel of interest and uses surrounding pixels (in this case, eight pixels with the following coordinates relative to the pixel of interest as peripheral pixels: coordinates (m−1, n−1), coordinates (m, n−1), coordinates (m+1, n−1), coordinates (m−1, n), coordinates (m+1, n), coordinates (m−1, n+1), coordinates (m, n+1), and coordinates (m+1, n+1)). Next, the face image processing apparatus computes the difference between the level value (for example, the gradation value of a luminance signal) of the pixel of interest and the level value of each peripheral pixel and extracts a peripheral pixel for which the computed difference is smaller than a predetermined threshold value TH. Then, the face image processing apparatus outputs a value obtained by adding a pixel value, which is obtained by multiplying the signal level of the extracted peripheral pixel by a predetermined coefficient, to the pixel value of the pixel of interest as a pixel value of the pixel of interest.

In this manner, in the conventional technology disclosed in Japanese Laid-open Patent Publication No. 2000-105815, the level width of the gradation value is limited by using only a peripheral pixel for which the difference with the level value of the pixel of interest is smaller than the threshold value TH as a processing target. Therefore, as illustrated in FIG. 9, the gradient of the edge portion of an epsilon filter image (ε filter image in the present drawing) output from an epsilon filter that is indicated by the dotted line does not get dull and the gradient of the edge portion of a process target image indicated by the solid line is held. As a result, the edge portion can be accurately saved and the other portion except for the edge portion can be blurred.

In the above-described conventional technology, there are problems in that a noise rejection intensity cannot be easily controlled and in that a noise rejection process cannot be performed at high speed even if the noise rejection intensity can be controlled.

Specifically, noises inside an image include a noise caused by a brightness (luminance) change and a noise caused by a color change. A color change stands out. A noise caused by the color change tends to largely exist in a low-luminance area. Therefore, to remove the noise caused by the color change in such a manner that an input image is not unnatural, it is necessary to change the rejection intensity of the color change noise in accordance with the luminance value of the input image. For example, in the conventional technology that uses the epsilon filter disclosed in Japanese Laid-open Patent Publication No. 2000-105815, it is extremely easy to incorporate a mechanism for changing filter characteristics from brightness component information in the case of noise rejection for a chroma (color) component. However, pixels other than filtering target information in an image are treated as pixel of interests and differences between the level values of the pixel of interests and the level values of peripheral pixels should be computed and compared with a threshold value. Therefore, there is a problem in that the processing load is large and a high-speed process is difficult due to the inclusion of condition branch processes by variables.

SUMMARY

According to an aspect of an embodiment of the invention, an image processing apparatus for generating a smoothed image obtained by blurring an input image includes a first smoothed image generating unit that sets pixels of the input image as process target pixels by using a plurality of low pass filters each having a plurality of different level value ranges, computes average values of the pixels included in the level value ranges from the pixels of the input image including process target pixels included within the filter sizes of the plurality of low pass filters, and generates a plurality of level-value-limited smoothed images limited by the plurality of level values; a second smoothed image generating unit that sets the pixels of the input image as process target pixels by using a plurality of low pass filters each having a plurality of level value ranges or filter sizes different from those of the first smoothed image generating unit, computes average values of the pixels included in the level value ranges from the pixels of the input image including process target pixels included within the filter sizes of the plurality of low pass filters, and generates a plurality of level-value-limited smoothed images limited by the plurality of level values; a selecting unit that selects one or more of the level-value-limited smoothed images generated by the first smoothed image generating unit or the second smoothed image generating unit on the basis of the process target pixels and level values different from the level values utilized by the first and second smoothed image generating units; and a synthesis processing unit that generates a smoothed image that uses values computed from level values of one or more of the pixels located at a position of the process target pixel or positions near the process target pixel in the one or more of the level-value-limited smoothed images selected by the selecting unit as the level values of the process target pixels.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 11 is a diagram explaining a smoothed image generating process that uses three-dimensional interpolation.

DESCRIPTION OF EMBODIMENTS

Preferred embodiments of the present invention will be explained with reference to accompanying drawings. The present invention is not limited to the embodiments explained below. Hereinafter, it will be sequentially explained about the main terms that are used in the present embodiment, the brief and special feature of an image processing apparatus according to the present embodiment, and the configuration and process flow of the image processing apparatus. Finally, it will be explained about various alternative examples of the present embodiment.

[a] First Embodiment

Explanation for Terms

First, it will be explained about the main terms that are used in the present embodiment. An "image processing apparatus"" " that is used in the present embodiment is an apparatus that receives an input image and image information, smoothes the received input image, and generates an output image. An input image may be a moving image or a still image and may be a color image or a monochrome image.

Figure 10:
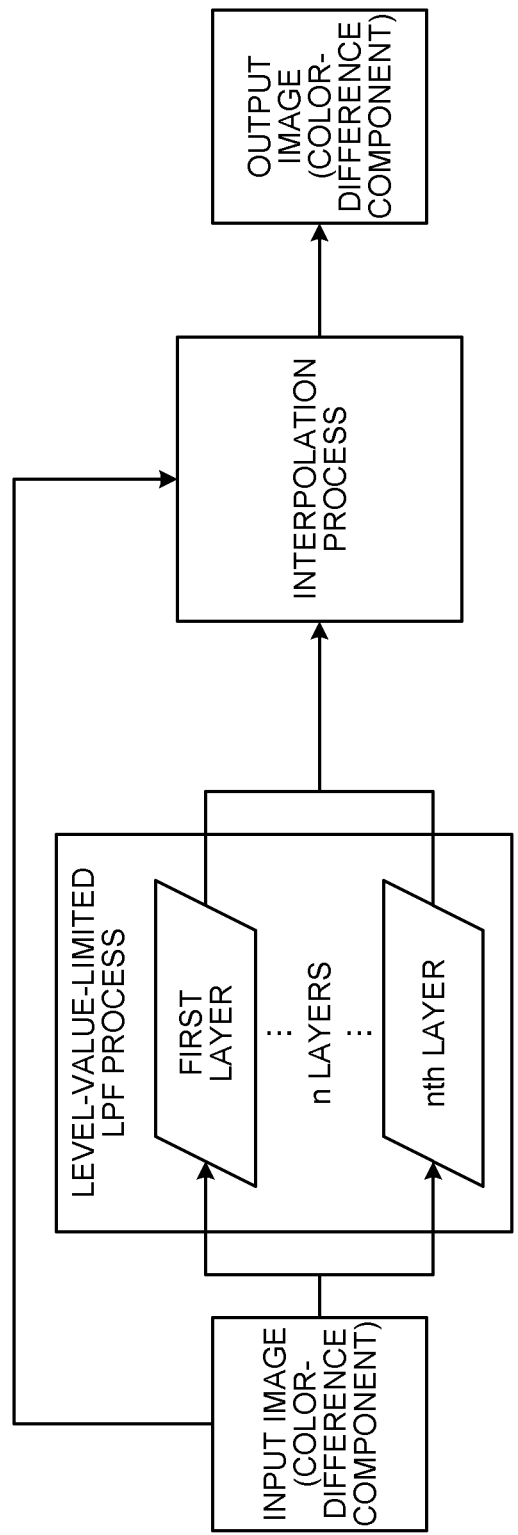
FIG. 10 is a diagram illustrating an example of an image processing apparatus that uses a plurality of low-pass filters.

Moreover, as a technique for accurately saving the edge portion of an image and blurring the other portion similarly to an epsilon filter, a technique for setting different level value ranges, previously generating a plurality of smoothed images by using a plurality of level-limit low-pass filters that generates a smoothed image by using only pixels within the level value ranges, and selecting and interpolating a plurality of smoothed results so as to accurately save the edge portion and blur the other portion except the edge portion is considered as illustrated in FIG. 10.

Specifically, the "image processing apparatus" includes low-pass filters (LPFs) from a first layer to an nth layer of which the level values are different to one another. In one-dimensional filtering process of an input image in a transverse direction, each LPF first determines whether the level values of the pixels of the input image within a filter size are within a level value range set therein. Then, the LPF accumulates the level values of pixels that fall within the level value range set therein by the determination, computes the average value of the accumulated level values, and uses the computed average value as the level value of a pixel of interest. Next, each LPF performs one-dimensional filtering process in a longitudinal direction on the image in which the filtering process in the transverse direction has been performed on all the pixels thereof, obtains the level values of all the pixels of the input image by using all the pixels as a pixel of interest, and generates a level-value-limited smoothed image. After that, the "image processing apparatus" synthesizes the generated level-value-limited smoothed images and generates a smoothed image.

When it is explained more specifically with reference to FIG. 11, the "image processing apparatus" includes a plurality of low-pass filters LPF0 to LPF4. The filters LPF0 to LPF4 respectively have the level values of 0 to 84 (P0), 42 to 128 (P1), 85 to 160 (P2), 129 to 212 (P3), and 161 to 255 (P4). In such a configuration, the "image processing apparatus" extracts the pixels of an input image 50 every three pixels in the longitudinal and transverse directions and generates a reduced image 51. Then, the filters LPF0 to LPF4 perform a level-value-limited smoothing process on the reduced image 51 and respectively generate level-value-limited smoothed images 52-1 to 52-5.

After that, when selecting, for example, a pixel g1 of the input image 50 as a pixel of interest, the image processing apparatus selects the level-value-limited smoothed images 52-1 to 52-5 on the basis of the level value of the pixel g1. When the level value of the pixel of interest g1 is included within the level-value limit range P4, the image processing apparatus selects the level-value-limited smoothed image 52-1 (a level-value-limited smoothed image 53-1) and selects a pixel g2 of the level-value-limited smoothed image 53-1 corresponding to the pixel of interest g1 and pixels g3 to g5 adjacent to the pixel p2. Moreover, the image processing apparatus selects pixels g6 to g9 corresponding to the pixels g2 to g5 of the level-value-limited smoothed image 53-1 from the pixels of a level-value-limited smoothed image 53-2 (the level-value-limited smoothed image 52-2) of which the level value range is the closest to the level value range of the selected level-value-limited smoothed image 53-1.

Then, the image processing apparatus performs level value interpolation (three-dimensional interpolation) by using the level values and position information (x-y coordinates) of the selected eight pixels g2 to g9 and expands the portion corresponding to an area e1 of the input image 50. At this time, when there is a pixel of which the level value is not included in the level value range P4 among the pixels located in the area e1 of the input image 50, the image processing apparatus selects the level-value-limited smoothed images 52-2 to 52-3 for the level value range that includes the level value of the pixel, performs the three-dimensional interpolation by using the level values and position information of the pixel corresponding to the pixel of interest g1 and pixels adjacent to the pixel, and expands the portion corresponding to the area e1 of the input image 50. In other words, the image processing apparatus expands only the portion corresponding to the area e1 of the level-value-limited smoothed images 52-1 to 52-5 that include the level values of the pixels of the area e1 of the input image 50.

After that, the image processing apparatus selects level-value-limited smoothed images 53-1 to 53-$n$, synthesizes level values thereof, and generates a smoothed image 54 on the basis of the level values of the pixels of the area e1 of the input image 50. The synthesis is performed by weighting the level values of the selected level-value-limited smoothed images in accordance with a difference between the central value of the level value range and the level value of a process target pixel and computing its average value. For example, when the level value of the process target pixel is 60, the image processing apparatus selects the filters LPF0 and LPF1 because level value ranges including 60 are P0 that indicates the level values of 0 to 84 and P1 that indicates the level values of 42 to 128. At this time, because the central value in the level value range P0 is 42 and the central value in the level value range P1 is 85, the "image processing apparatus" weights the level values of the pixels of the LPF1 that has the central value of the level values close to the level value (60) of the process target pixel to increase the weights of the level values and computes its average value by further using position information (vertical axis (X axis), horizontal axis (Y axis)) when the input image is a reduced image, so as to synthesize the generated level-value-limited smoothed images and generate a smoothed image. Specifically, the "image processing apparatus" utilizes "pixel level value of LPF1×($25/43$)+pixel level value of LPF0×($18/43$)", for example.

In this manner, the "image processing apparatus" performs three-dimensional interpolation on the generated level-value-limited smoothed images by using the level value and position information of the process target pixel, and thus can accurately save the edge portion of an image and perform a blurring process on the portion other than the edge at high speed.

However, when noise rejection intensity is controlled by using the technique, there is a problem in that filter characteristics cannot be changed in accordance with information other than a processing target channel because a plurality of smoothed images is previously created in accordance with level values. In other words, when using the LPFs that respectively have different level value ranges, noise rejection intensity cannot be controlled because a level value range limited to a characteristic such as a color difference component or a luminance (brightness) component is set for each level value and the characteristic cannot be changed. On the other hand, because the "image processing apparatus" that uses the plurality of LPFs can accurately save the edge portion of an image and perform a blurring process on the portion other than the edge at high speed. Therefore, it is earnestly desired to control noise rejection intensity by using the plurality of LPFs that has different level value limits.

Brief and Special Feature of Image Processing Apparatus

Figure 1:
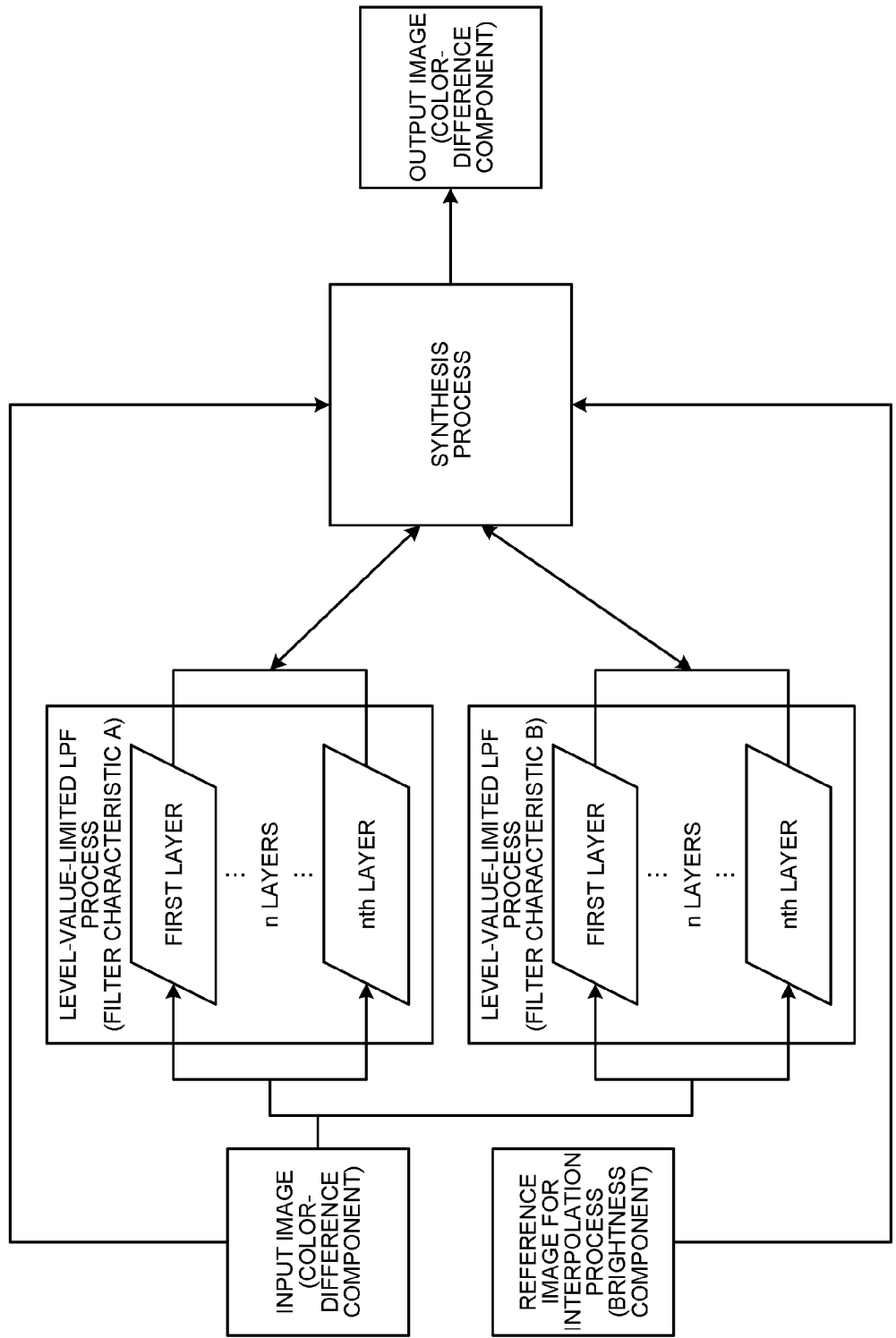
FIG. 1 is a diagram explaining the brief and special feature of an image processing apparatus according to a first embodiment.

Next, it will be explained about the brief and special feature of an image processing apparatus according to the first embodiment with reference to FIG. 1. FIG. 1 is a diagram explaining the brief and special feature of the image processing apparatus according to the first embodiment.

As illustrated in FIG. 1, the brief of the image processing apparatus is to generate a smoothed image, which is obtained by blurring an input image, from the input image. Particularly, the main special feature of the image processing apparatus is to be able to easily control noise rejection intensity at high speed.

When it is specifically explained about the main special feature, the image processing apparatus includes a plurality of low-pass filters that respectively has a plurality of different level value ranges (filter characteristic A) and a plurality of low-pass filters that respectively has a plurality of level value ranges different from the filter characteristic A or a plurality of filter sizes (filter characteristic B).

By employing such a configuration, the image processing apparatus uses the pixels of a color-difference component image consisting of color difference components of an input image as process target pixels, computes the average values of the pixels included in level value ranges from the pixels of the input image that includes the process target pixels included within the filter sizes of the plurality of low-pass filters, and generates a plurality of level-value-limited smoothed images in the filter characteristic A, by using the plurality of low-pass filters that has the filter characteristic A. Similarly, the image processing apparatus uses the pixels of an color-difference component image consisting of color difference components of an input image as process target pixels and generates a plurality of level-value-limited smoothed images in the filter characteristic B, by using the plurality of low-pass filters that has the filter characteristic B.

After that, the image processing apparatus selects one or a plurality of level-value-limited smoothed images generated with the filter characteristic A or the filter characteristic B on the basis of the level values of the color difference components used for generating the level-value-limited smoothed images and the level values of different luminance (brightness) components. Then, similarly to the above-described technique for processing the plurality of selected level-value-limited smoothed images, the image processing apparatus generates a smoothed image that uses values computed from the level values of one or a plurality of pixels located at the position of the process target pixel or the positions near the process target pixel in the selected one or plurality of level-value-limited smoothed images as the level values of the process target pixels.

In this manner, the image processing apparatus according to the first embodiment previously includes a plurality of low-pass filter groups that has different filter characteristics. The image processing apparatus can select and synthesize level-value-limited smoothed images that are obtained by using the filter characteristics on the basis of information (image information) other than components that are a processing target of an input image. As a result, noise rejection intensity can be easily controlled at high speed.

Configuration of Image Processing Apparatus

Figure 2:
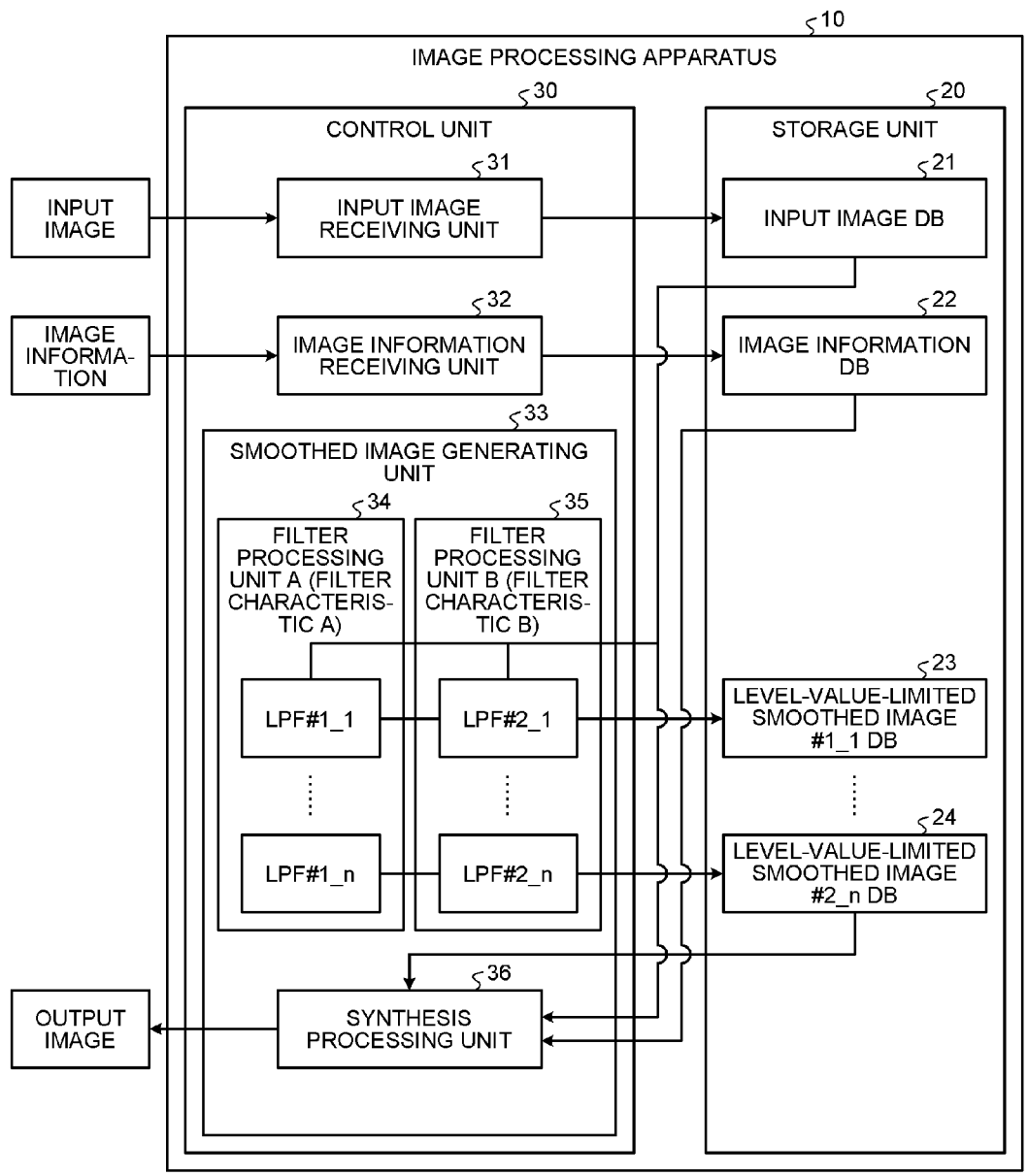
FIG. 2 is a block diagram illustrating the configuration of the image processing apparatus according to the first embodiment.

Next, it will be explained about the configuration of the image processing apparatus illustrated in FIG. 1 with reference to FIG. 2. FIG. 2 is a block diagram illustrating the configuration of an image processing apparatus 10 according to the first embodiment. As illustrated in FIG. 2, the image processing apparatus 10 includes a storage unit 20 and a control unit 30.

The storage unit 20 stores therein data and programs required for various types of processes performed by the control unit 30. Particularly, as those closely relevant to the present invention, the storage unit 20 includes an input image DB 21, an image information DB 22, and a level-value-limited smoothed image #1_1 DB 23 to a level-value-limited smoothed image #2_$n$ DB 24.

The input image DB 21 stores a received input image. Specifically, the input image DB 21 stores a one-frame input image that is received by an input image receiving unit 31 to be described below.

The image information DB 22 stores therein information other than components that are a processing target of the input image as image information. Specifically, the image information DB 22 stores image information that is acquired from the input image by an image information receiving unit 32 to be described below. For example, when the input image is a color-difference component image, the image information DB 22 stores the brightness component image of the input image. Moreover, when some kind of correction is performed on the input image by the previous-stage device of the image processing apparatus, the image information DB 22 stores corrected amount information thereof. Moreover, when the input image is a brightness component image, the image information DB 22 also stores the corrected amount information of the input image.

The level-value-limited smoothed image #1_1 DB 23 to the level-value-limited smoothed image #2_n DB 24 store therein generated level-value-limited smoothed images. Specifically, the level-value-limited smoothed image #1_1 DB 23 to the level-value-limited smoothed image #2_n DB 24 are databases of which the number is the number of LPFs included in a filter processing unit A 34 to be described below and the number of LPFs included in a filter processing unit B 35 to be described below and that respectively correspond to the LPFs. For example, the level-value-limited smoothed image #1_1 DB 23 stores a level-value-limited smoothed image that is generated by the LPF #1_1 of the filter processing unit A. Moreover, the level-value-limited smoothed image #1_n DB stores a level-value-limited smoothed image that is generated by the LPF #1_n of the filter processing unit A. The level-value-limited smoothed image #2_5 DB stores a level-value-limited smoothed image that is generated by the LPF #2_5 of the filter processing unit B.

The control unit 30 includes an internal memory that stores therein a control program such as an OS (Operating System), programs that defines various types of processing procedures, and required data. Particularly, as those closely relevant to the present invention, the control unit 30 includes the input image receiving unit 31, the image information receiving unit 32, a smoothed image generating unit 33, and a synthesis processing unit 36, and carries out various processes by using these units.

The input image receiving unit 31 receives the input image by one frame and stores the received input image in the input image DB 21. The image information receiving unit 32 reads the image information of the input image and stores the read image information in the image information DB 22. For example, when the input image is a color-difference component image (U and V components), the image information receiving unit 32 reads the brightness component (Y component) image of the input image and stores the read brightness component image in the image information DB 22. Moreover, when some kind of correction has been performed on the input image in the previous stage of the image processing apparatus, the image information receiving unit 32 reads the corrected amount information from the input image and stores the read information in the image information DB 22. Moreover, when the input image is a brightness component image, the image information receiving unit 32 similarly reads the corrected amount information of the input image and stores the read information in the image information DB 22.

The smoothed image generating unit 33 is a processing unit that uses, by using a plurality of low-pass filters that has a plurality of different level value ranges, the pixels of the input image as process target pixels, computes the average values of pixels included in the level value ranges from the pixels of the input image including process target pixels included within the filter sizes of the plurality of low-pass filters, and generates a plurality of level-value-limited smoothed images that is limited by a plurality of level values. Particularly, as those closely relevant to the present invention, the smoothed image generating unit 33 includes the filter processing unit A 34 and the filter processing unit B 35.

The filter processing unit A 34 and the filter processing unit B 35 respectively include a plurality of low-pass filters (filter characteristic A and filter characteristic B) that has a plurality of different level value ranges. The filter processing unit A 34 and the filter processing unit B 35 carry out a level-value-limited smoothing process for accumulating and averaging the pixels of the input image that are within level value ranges designated within predetermined filter sizes and generate level-value-limited smoothed images. In this case, the average value may be computed as a weighted average value according to the distance away from the center of filter in such a manner that the weights of the pixels located at the center of the filter increase and the weights of the pixels located at both ends of the filter decrease.

Specifically, the LPFs that are included in each of the filter processing unit A 34 and the filter processing unit B 35 are one-dimensional low-pass filters and previously have different level value ranges. The LPFs perform a level-value-limited smoothing process for smoothing (computing the average values of) pixels (processing targets) of which the level values of the input image stored in the storage unit are within the level value ranges set therein, generate level-value-limited smoothed images, and store the generated level-value-limited smoothed images in the corresponding level-value-limited smoothed image DBs. For example, when the filter is the LPF #1_1, the level-value-limited smoothed image is stored in the level-value-limited smoothed image DB #1_1. In this case, it is preferable that a part of a level value range set in an LPF is overlapped on at least two LPFs. However, it is only necessary to cover the level value range of the input image. Furthermore, the filter size and the level value range of the LPF may be set to a fixed value or be set to a value input from the outside.

For example, the LPF #1_1 to LPF #1_n included in the filter processing unit A 34 and the LPF #2_1 to LPF #2_n included in the filter processing unit B 35 have different parameter set values of level value ranges and different filter sizes to set different filtering characteristics. In this case, the filter processing units A and B respectively have 17 layers of LPF 1_1 to LPF 1_17 and LPF 2_1 to LPF 2_17 depending on the applications. Of course, the filter processing units A and B may respectively have the different number of layers. In this case, the level value ranges from the LPF 1_1 to LPF 1_17 are sequentially set to 0 to 16, 0 to 32, 16 to 48, 32 to 64, 48 to 80, 64 to 96, 80 to 112, 96 to 128, 112 to 144, 128 to 160, 144 to 176, 160 to 192, 176 to 208, 192 to 224, 208 to 240, 224 to 255, and 240 to 255, of which all the filter sizes are set to 15. Moreover, the level value ranges from the LPF 2_1 to LPF 2_17 are sequentially set to 0 to 8, 8 to 24, 24 to 40, 40 to 56, 56 to 72, 72 to 88, 88 to 104, 104 to 120, 120 to 136, 136 to 152, 152 to 168, 168 to 184, 184 to 200, 200 to 216, 216 to 232, 232 to 248, and 248 to 255, of which all the filter sizes are set to 5. In this way, different filter characteristics are set in the filter processing units A and B in such a manner that the filter processing unit A 34 performs a smoothing process more strongly and the filter processing unit B 35 performs a smoothing process more weakly. Of course, various types of parameters may be different depending on the applications.

The synthesis processing unit 36 selects one or a plurality of level-value-limited smoothed images from the plurality of level-value-limited smoothed images generated by the filter processing unit A 34 or the filter processing unit B 35 on the basis of the process pixel of interests and level values different from the level values used in the filter processing unit A 34 and the filter processing unit B 35. Then, the synthesis processing unit 36 generates a smoothed image that uses values computed from the level values of one or a plurality of pixels located at the position of the process target pixel or the positions near the process target pixel in the selected one or plurality of level-value-limited smoothed images as the level values of the process target pixels.

Specifically, the synthesis processing unit 36 selects a pixel (process target pixel) that is a processing target from the input image, acquires image information, corresponding to the selected pixel, acquired by the image information receiving unit 32 from the image information DB 22, and selects either of a level-value-limited smoothed image group of the filter characteristic A or a level-value-limited smoothed image group of the filter characteristic B. Assuming that a process target image is a color difference component and image information is a brightness component, the synthesis processing unit 36 previously utilizes a selection method stored in the image information DB 22 in such a manner that the smoothing result of the filter characteristic A is selected if the brightness of the same position as that of a process target image is dark and the result of the filter characteristic B is selected if it is light. Next, the synthesis processing unit 36 selects a plurality of level-value-limited smoothed images in which the level values of the process targets pixel are used as level value ranges from the selected filter characteristic group. In this case, when the level value ranges set in LPFs are overlapped, the level values of the process target pixels are used as level value ranges. Moreover, when there are the plurality of level-value-limited smoothed images, two or more level-value-limited smoothed images that have the small difference between the central value of the level value range and the level value of the process target pixel are selected.

After that, the synthesis processing unit 36 extracts the level values of pixels corresponding to the positions of the process target pixels from the selected level-value-limited smoothed images, weights the extracted level values in accordance with the difference between the central value of the level value range and the level value of the process target pixel and computes its average value, and treats the average value as the level value of a pixel at which a process target pixel is located. Then, the synthesis processing unit 36 calculates the level value of a pixel corresponding to the position of the process target pixel and generates and outputs an output image by using all the pixels of the input image as process target pixels.

Process by Image Processing Apparatus

Figure 3:
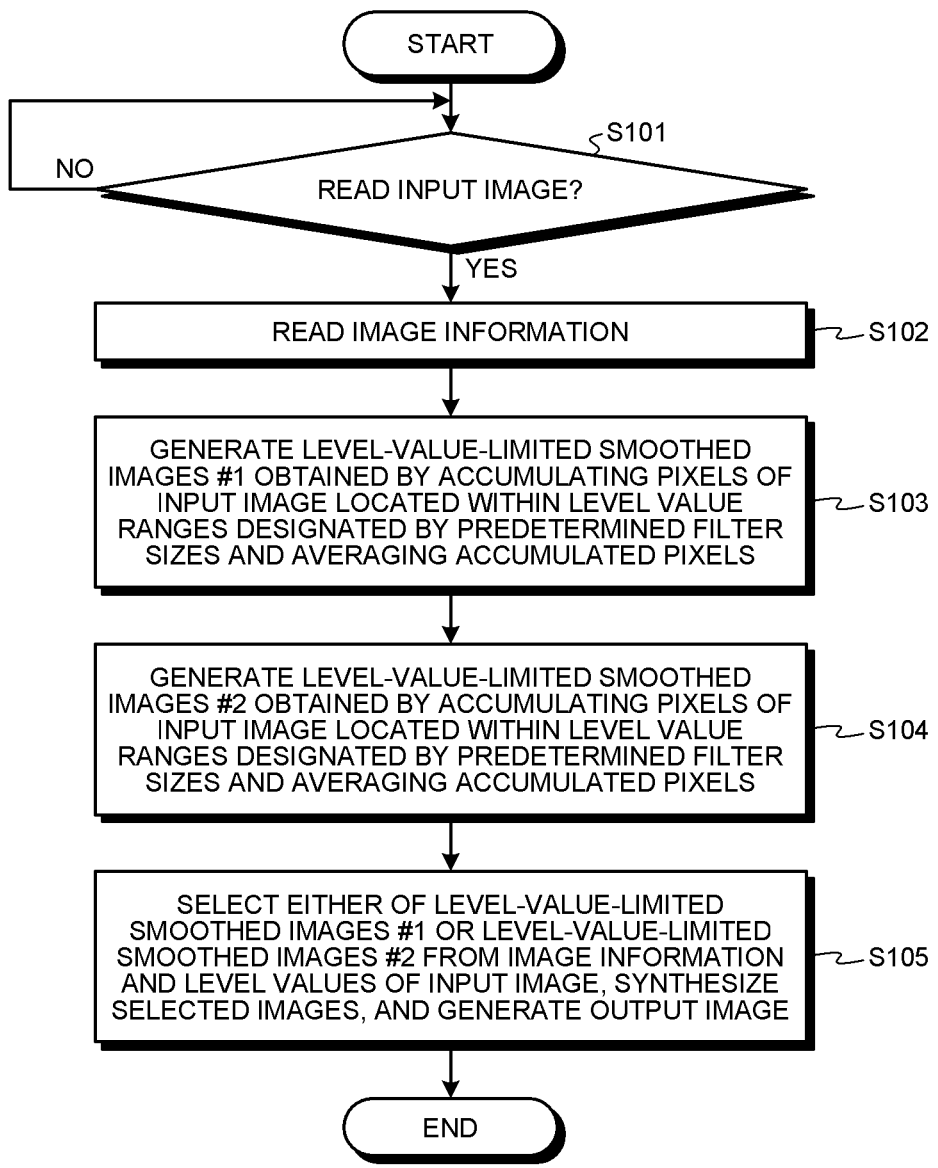
FIG. 3 is a flowchart illustrating the flow of a smoothed image generating process performed by the image processing apparatus according to the first embodiment.

Next, it will be explained about a process performed by the image processing apparatus with reference to FIG. 3. FIG. 3 is a flowchart illustrating the flow of a smoothed image generation process performed by the image processing apparatus according to the first embodiment.

As illustrated in FIG. 3, when an input image is received by the input image receiving unit 31 and is stored in the input image DB 21 (Step S101: YES), the image information receiving unit 32 acquires image information from the input image and stores the image information in the image information DB 22 (Step S102).

Next, the filter processing unit A 34 uses the pixels of the input image as process target pixels by using a plurality of low pass filters that has a plurality of different level value ranges, computes the average values of the pixels included in the level value ranges from the pixels of the input image including process target pixels included within the filter sizes of the plurality of low pass filters, and generates a plurality of level-value-limited smoothed images limited by the plurality of level values (Step S103).

In other words, the filter processing unit A 34 generates level-value-limited smoothed images #1 that are obtained by accumulating and averaging the pixels of the input image located within the level value ranges designated by predetermined filter sizes by using LPF #1_1 to LPF #1_$n$ ($n$=17) of the filter characteristic A. For example, the filter processing unit A 34 uses the pixels of a color-difference component image consisting of the color difference components of the input image as process target pixels and generates the level-value-limited smoothed images #1 that are obtained by accumulating and averaging the pixels of the input image located within the level value ranges designated by the predetermined filter sizes by using LPF #1_1 to LPF #1_$n$ ($n$=17) of the filter characteristic A.

Next, the filter processing unit B 35 uses the pixels of the input image as process target pixels by using a plurality of low pass filters that has a plurality of level value ranges different from those of the filter processing unit A 34, computes the average values of the pixels included in the level value ranges from the pixels of the input image including the process target pixels included within the filter sizes of the plurality of low pass filters, and generates a plurality of level-value-limited smoothed images limited by the plurality of level values (Step S104).

In other words, the filter processing unit B 35 generates level-value-limited smoothed images #2 that are obtained by accumulating and averaging the pixels of the input image located within the level value ranges designated by predetermined filter sizes by using LPF #2_1 to LPF #2_$n$ ($n$=17) of the filter characteristic B. For example, the filter processing unit A 34 uses the pixels of a color-difference component image consisting of color difference components of the input image as process target pixels and generates the level-value-limited smoothed images #2 that are obtained by accumulating and averaging the pixels of the input image located within the level value ranges designated by the predetermined filter sizes by using LPF #2_1 to LPF #2_$n$ ($n$=17) of the filter characteristic B.

After that, the synthesis processing unit 36 selects either of the level-value-limited smoothed images #1 or the level-value-limited smoothed images #2 on the basis of the image information and the level values of the input image stored in the image information DB 22, synthesizes the selected level-value-limited smoothed images, and generates a smoothed image as an output image (Step S105).

Effect by First Embodiment

In this way, according to the first embodiment, the image processing apparatus uses the pixels of an input image as process target pixels by using the plurality of low pass filters (LPF #1_1 to LPF #1_$n$) that has the plurality of different level value ranges, computes the average values of the pixels included in the level value ranges from the pixels of the input image including process target pixels included within the filter sizes of the plurality of low pass filters to generate the plurality of level-value-limited smoothed images #1 limited by the plurality of level values, uses the pixels of the input image as process target pixels by using the plurality of low pass filters (LPF #2_1 to LPF #2_n) that has the plurality of level value ranges or the filter sizes different from those of LPF #1_1 to LPF #1_n, computes the average values of the pixels included in the level value ranges from the pixels of the input image including process target pixels included within the filter sizes of the plurality of low pass filters to generate the plurality of level-value-limited smoothed images #2 limited by the plurality of level values, selects one or a plurality of level-value-limited smoothed images from the generated plurality of level-value-limited smoothed images on the basis of the process target pixels and level values different from the level values that are used in LPF #1_1 to LPF #1_n and LPF #2_1 to LPF #2_n, and generates a smoothed image that uses values computed from the level values of one or a plurality of pixels located at the position of the process target pixel or the positions near the process target pixel in the selected one or plurality of level-value-limited smoothed images as the level values of the process target pixels. Therefore, the image processing apparatus previously includes a plurality of low pass filter groups that has different filter characteristics and can select and synthesize level-value-limited smoothed images acquired by using any filter characteristic on the basis of information (image information) other than components that are the processing targets of an input image. As a result, noise rejection intensity can be simply controlled at high speed.

Moreover, according to the first embodiment, the image processing apparatus uses the pixels of a color-difference component image consisting of color difference components of an input image as process target pixels by using the plurality of low pass filters (LPF #1_1 to LPF #1_n) that has the plurality of different level value ranges to generate the plurality of level-value-limited smoothed images #1, uses the pixels of a color-difference component image consisting of color difference components of the input image as process target pixels by using the plurality of low pass filters (LPF #2_1 to LPF #2_n) that has the level value ranges or the filter sizes different from those of LPF #1_1 to LPF #1_n to generate the plurality of level-value-limited smoothed images #2, and selects one or a plurality of level-value-limited smoothed images from the generated plurality of level-value-limited smoothed images on the basis of the process target pixels and the level values of brightness (lightness) components different from the level values of the color difference components used in LPF #1_1 to LPF #1_n and LPF #2_1 to LPF #2_n. Therefore, the rejection intensity of color change noises can be controlled in a few computational amounts in accordance with the brightness of an input image.

[b] Second Embodiment

In the first embodiment, it has been explained about the case where a plurality of level-value-limited smoothed images is generated from an input image. However, the present invention is not limited to this. To speed up a process, an image processing apparatus can generate the reduced image of an input image and generate a plurality of level-value-limited smoothed images from the generated reduced image.

Therefore, in the second embodiment, it has been explained about the case where the image processing apparatus generates the reduced image of an input image and generates a plurality of level-value-limited smoothed images from the generated reduced image.

Configuration of Image Processing Apparatus (Second Embodiment)

Figure 4:
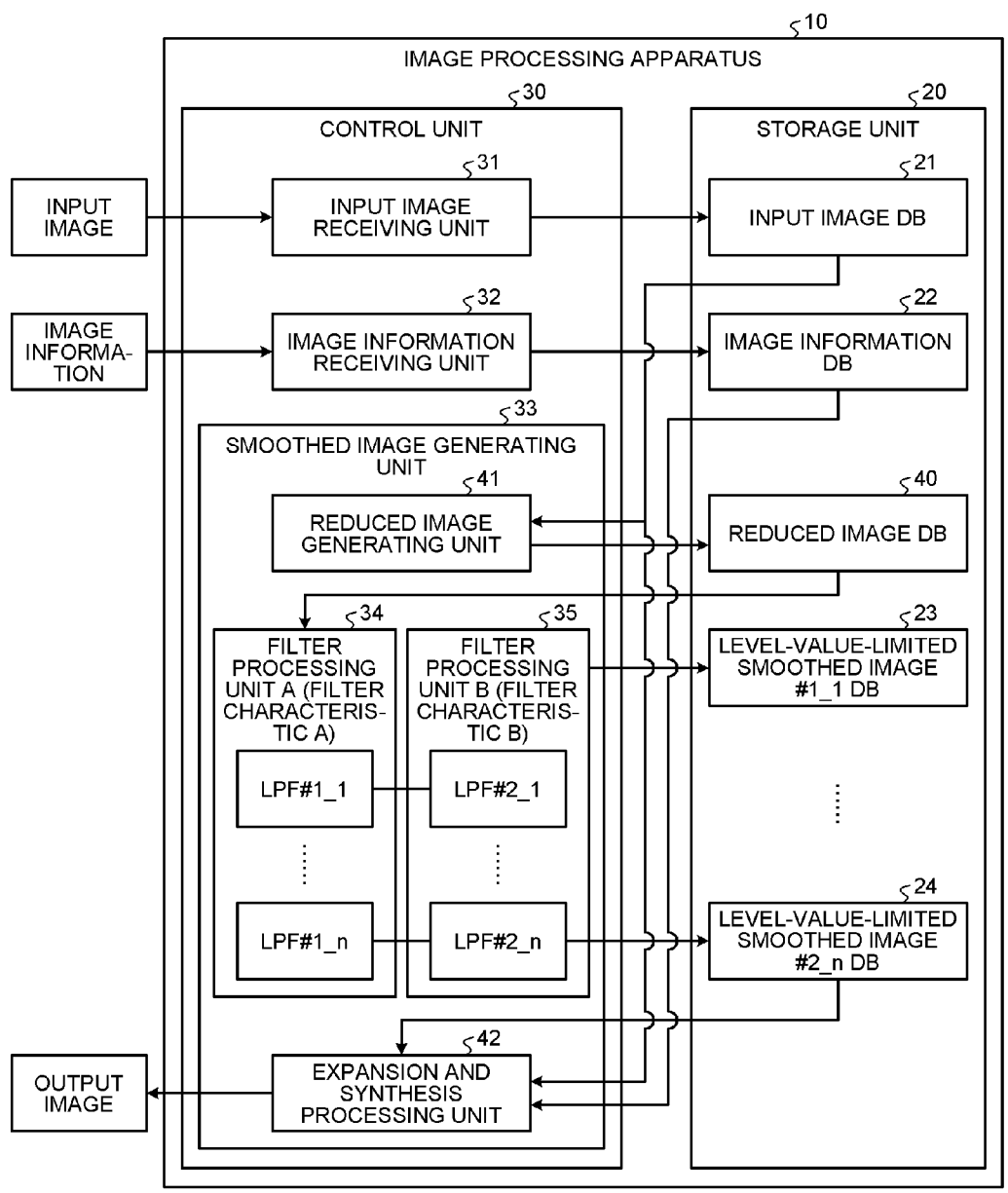
FIG. 4 is a block diagram illustrating the configuration of an image processing apparatus according to a second embodiment.

First, it will be explained about the configuration of the image processing apparatus according to the second embodiment with reference to FIG. 4. FIG. 4 is a block diagram illustrating the configuration of the image processing apparatus 10 according to the second embodiment.

As illustrated in FIG. 4, the image processing apparatus 10 according to the second embodiment includes the storage unit 20 and the control unit 30. Among them, because "the input image DB 21, the image information DB 22, and the level-value-limited smoothed image #1_1 DB 23 to the level-value-limited smoothed image #2_n DB 24" of the storage unit 20 and "the input image receiving unit 31, the image information receiving unit 32, the filter processing unit A 34, and the filter processing unit B 35" of the control unit 30 have the same functions as those of the units of the first embodiment, it will be below explained about a reduced image DB 40 of the storage unit 20 and a reduced image generating unit 41 and an expansion and synthesis processing unit 42 of the control unit 30 that have functions different from those of the units of the first embodiment.

The reduced image DB 40 of the storage unit 20 stores a reduced image that is obtained by thinning out the pixels of an input image to reduce the input image (to reduce the number of pixels). Specifically, the reduced image DB 40 stores a reduced image that is obtained by thinning out the pixels of an input image to reduce the input image by using the reduced image generating unit 41 to be described below.

The reduced image generating unit 41 of the control unit 30 thins out, with respect to an input image that is received by the input image receiving unit 31 and stored in the input image DB 21, the pixels of the input image and generates a reduced image. Specifically, the reduced image generating unit 41 acquires the input image stored in the input image DB 21, thins out the pixels of the acquired input image in a predetermined range to generate a reduced image that is obtained by reducing the input image, and stores the generated reduced image in the reduced image DB 40.

The expansion and synthesis processing unit 42 expands the level-value-limited smoothed images stored in the level-value-limited smoothed image #1_1 DB 23 to the level-value-limited smoothed image #2_n DB 24 to the size of the input image, performs a selection and synthesis process on the level-value-limited smoothed images corresponding to the pixels on the basis of the level values of the pixels of the input image and the image information stored in the image information DB 22, and generates an output image.

Specifically, the expansion and synthesis processing unit 42 inputs four input values (four-dimensional interpolation) of the level value of input pixel, position information (X position and Y position), and image information to perform a synthesis process for outputting an output pixel value. In other words, a three-dimensional interpolation technique performed by a conventional technique is to input the level value of input pixel and position information (X position and Y position) and output an output pixel value. The technique simultaneously performs a process for selecting and complementing level-value-limited smoothed images in accordance with the level values of input pixels and a process for inputting and interpolating the X positions and Y positions of input pixels because the level-value-limited smoothed images are reduced images. On the other hand, the expansion and synthesis processing unit 42 further performs a process for switching level-value-limited smoothed images used for the three-dimensional interpolation in accordance with the value of image information.

Process by Image Processing Apparatus (Second Embodiment)

Figure 5:
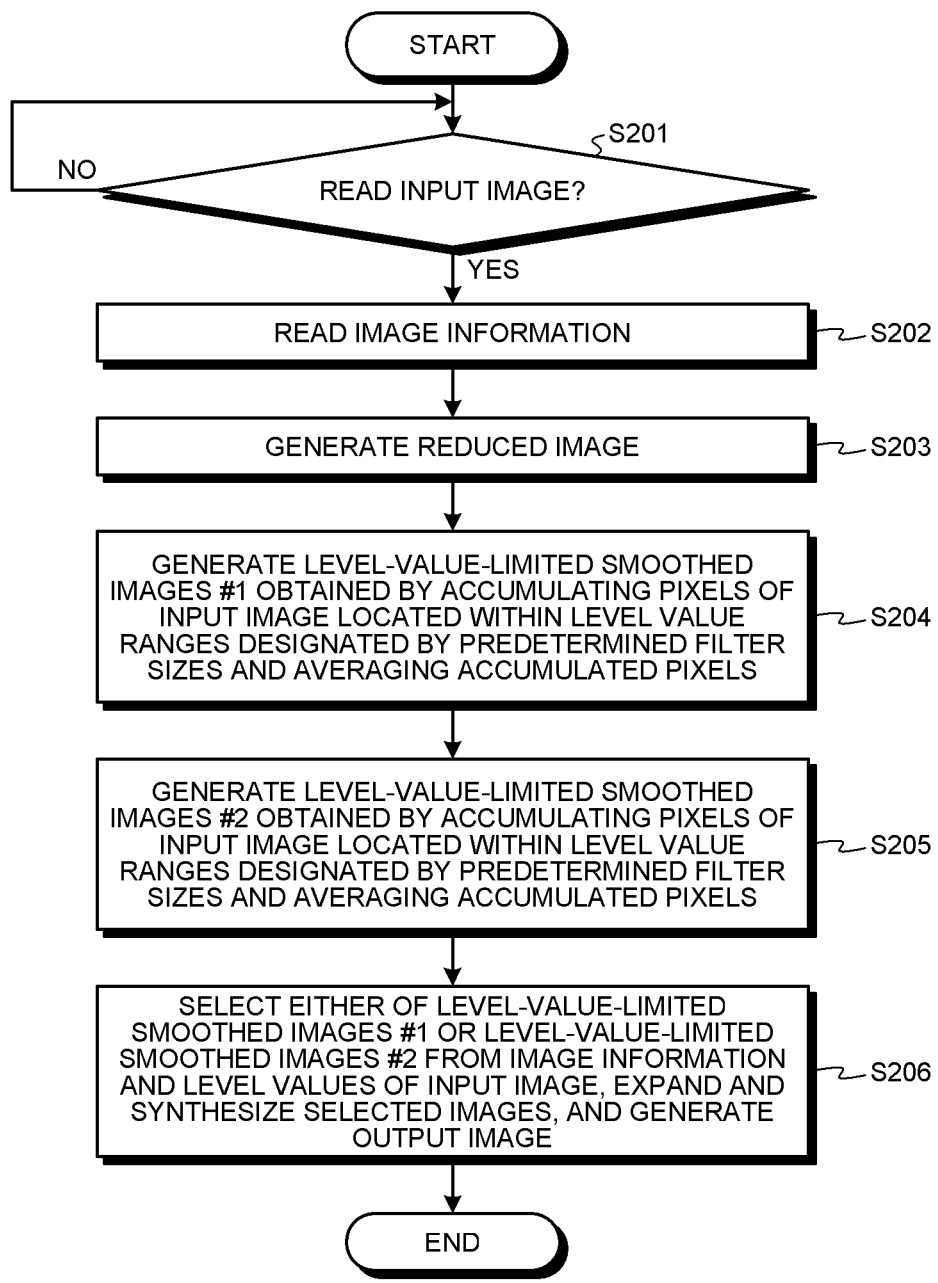
FIG. 5 is a flowchart illustrating the flow of a smoothed image generating process performed by the image processing apparatus according to the second embodiment.

Next, it will be explained about a process performed by the image processing apparatus with reference to FIG. 5. FIG. 5 is a flowchart illustrating the flow of a smoothed image generation process performed by the image processing apparatus according to the second embodiment.

As illustrated in FIG. 5, when an input image is received by the input image receiving unit 31 and is stored in the input image DB 21 (Step S201: YES), the image information receiving unit 32 acquires image information from the input image and stores the image information in the image information DB 22 (Step S202). The reduced image generating unit 41 generates a reduced image that is obtained by thinning out the pixels of the input image stored in the input image DB 21 to reduce the input image and stores the reduced image in the reduced image DB 40 (Step S203).

Next, the filter processing unit A 34 uses the pixels of the reduced image of the input image stored in the reduced image DB 40 as process target pixels by using a plurality of low pass filters that has a plurality of different level value ranges, computes the average values of the pixels included in the level value ranges from the pixels of the input image including process target pixels included within the filter sizes of the plurality of low pass filters, and generates a plurality of level-value-limited smoothed images limited by the plurality of level values (Step S204).

Next, the filter processing unit B 35 uses the pixels of the reduced image of the input image stored in the reduced image DB 40 as process target pixels by using a plurality of low pass filters that has a plurality of level value ranges different from those of the filter processing unit A 34, computes the average values of the pixels included in the level value ranges from the pixels of the input image including process target pixels included within the filter sizes of the plurality of low pass filters, and generates a plurality of level-value-limited smoothed images limited by the plurality of level values (Step S205).

After that, the expansion and synthesis processing unit 42 selects either of the level-value-limited smoothed images #1 or the level-value-limited smoothed images #2 from the image information and the level values of the input image stored in the image information DB 22, expands the selected images to the original size of the input image, synthesizes the expanded images, and generates a smoothed image as an output image (Step S206).

Effect by Second Embodiment

In this way, according to the second embodiment, the filter processing unit A 34 uses the pixels of a reduced image that is obtained by reducing an input image as process target pixels by using the plurality of low pass filters that has the plurality of different level value ranges and generates a plurality of level-value-limited smoothed images. The filter processing unit B 35 uses the pixels of the reduced image that is obtained by reducing the input image as process target pixels by using the plurality of low pass filters that has the plurality of level value ranges or the filter sizes different from those of the filter processing unit A 34 and generates a plurality of level-value-limited smoothed images. The expansion and synthesis processing unit 42 generates, with respect to the selected one or plurality of level-value-limited smoothed images, a smoothed image that uses values computed from the level values of one or a plurality of pixels located at the position of the process target pixel or the positions near the process target pixel in the selected level-value-limited smoothed images as the level values of the process target pixels by using the level value of a pixel, position information, and a level value different from that of a process target pixel. Therefore, noise rejection intensity can be controlled at higher speed.

[c] Third Embodiment

Although it has been explained about the embodiments of the present invention till now, the present invention may be realized by various different configurations in addition to the embodiments described above. Therefore, as described below, it will be explained about a different embodiment on the basis of (1) image information, (2) number of filter groups and LPFs, (3) system configuration, and (4) program.

(1) Image Information

For example, the present apparatus selects level-value-limited smoothed images generated by the filter processing unit A 34 or the filter processing unit B 35 and synthesizes the selected level-value-limited smoothed images. In this case, the selection technique utilizes the image information of an input image. For example, in the first embodiment, it has been explained about the case where level-value-limited smoothed images are selected on the basis of the brightness (lightness) component of an input image when the input image is a color-difference component image. However, the present invention is not limited to this. The level-value-limited smoothed images can be selected by using diverse image information.

For example, when an input image is a color-difference component (U and V components) image, the present apparatus reads the brightness component (Y component) image of the input image and stores the read brightness component image in the image information DB 22. Moreover, when an input image is corrected in the previous stage of the present image processing apparatus as in a digital camera or the like, the present apparatus reads the corrected amount information from the input image and stores the read information in the image information DB 22. Moreover, when an input image is a brightness component image, the present apparatus similarly reads the corrected amount information of the input image and stores the read information in the image information DB 22. Then, the present apparatus reads the image information stored in the image information DB 22 and selects level-value-limited smoothed images. In this case, as in a digital camera illustrated above, a correction for processing an input image in the previous stage of the present image processing apparatus means, for example, a correction process that is previously performed like a brightness correction process, an outline highlight correction process, or the like.

In this way, the present apparatus can use a color-difference component image as an input image, select level-value-limited smoothed images by using correction information, and thus generate color-difference-component smoothed images and select and synthesize the smoothed images based on the correction information. As a result, a high-quality noise rejection result can be obtained. Moreover, the present apparatus can use a brightness component image as an input image, select level-value-limited smoothed images by using correction information, and thus generate brightness-component smoothed images and select and synthesize the smoothed images based on the correction information. As a result, a high-quality noise rejection result can be obtained.

(2) Number of Filter Groups and LPFs

In the first embodiment, it has been explained about the case where two filter processing units that have different filter characteristics are configured. However, the present invention is not limited to this. The filter processing units can be constituted by the number of filter characteristics. Moreover, in the first embodiment, it has been explained about the case where each filter processing unit includes 17-layer LPFs. However, the present invention is not limited to this. The number of LPFs can be arbitrarily set.

(3) System Configuration

Moreover, among the processes described in the present embodiments, the whole or a part of processes (for example, an input image reception process and the like) that have been automatically performed can be manually performed. Also, processing procedures, control procedures, concrete titles, and information including various types of data and parameters, which are described in the document and the drawings, can be arbitrarily changed except that they are specially mentioned.

Moreover, each component of each apparatus illustrated in the drawings is a functional concept. Therefore, these components are not necessarily constituted physically as illustrated in the drawings. In other words, the specific configuration of dispersion/integration of each apparatus is not limited to the illustrated configuration. Therefore, all or a part of each apparatus can dispersed or integrated functionally or physically in an optional unit in accordance with various types of loads or operating conditions. For example, an input image receiving unit and an image information receiving unit may be integrated. Furthermore, all or a part of each process function performed by each apparatus can be realized by CPU and a program that is analyzed and executed by the CPU or can be realized by a hardware by wired logic.

(4) Program

Various types of processes explained in the embodiments can be realized by executing a previously-prepared program by using a computer system such as a personal computer or a workstation. Therefore, a computer system that executes a program having the same functions as those of the embodiments is below explained as another embodiment.

Figure 6:
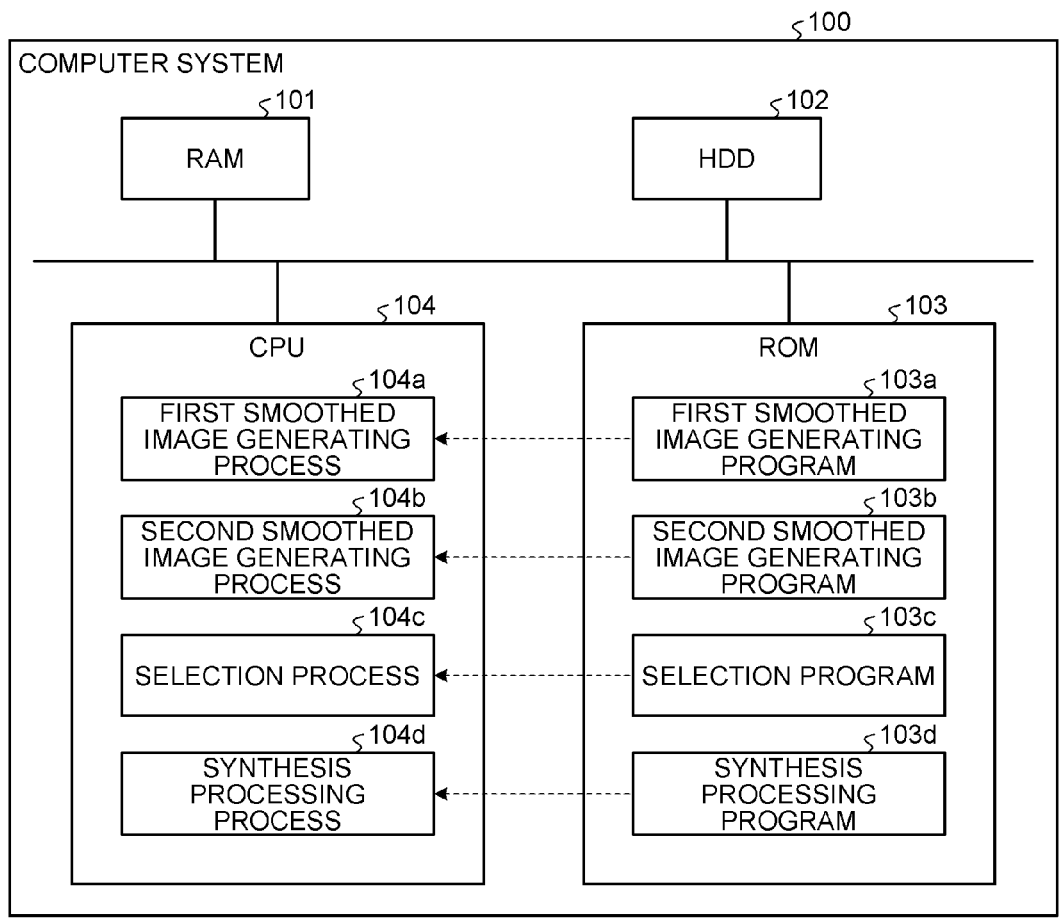
FIG. 6 is a diagram illustrating an example of a computer system that executes an image processing program.
Figure 7:
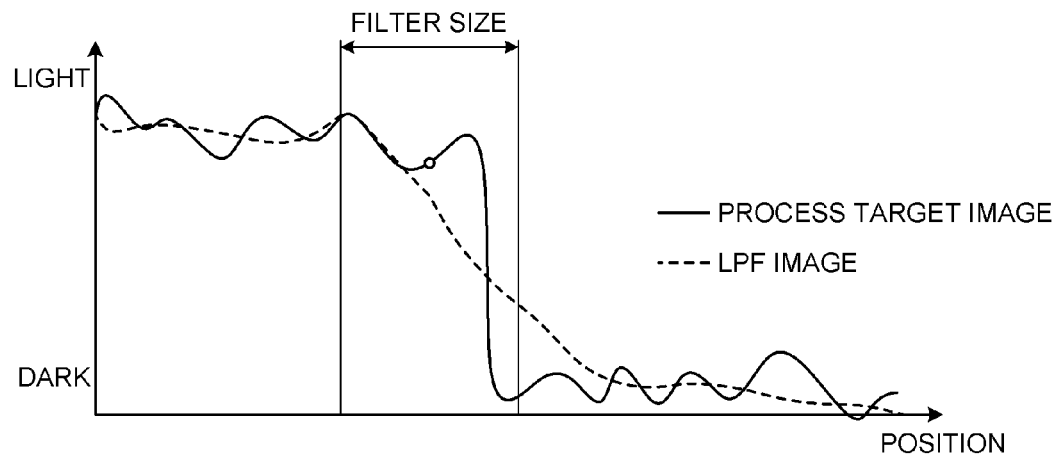
FIG. 7 is a diagram explaining a conventional technology.
Figure 8:
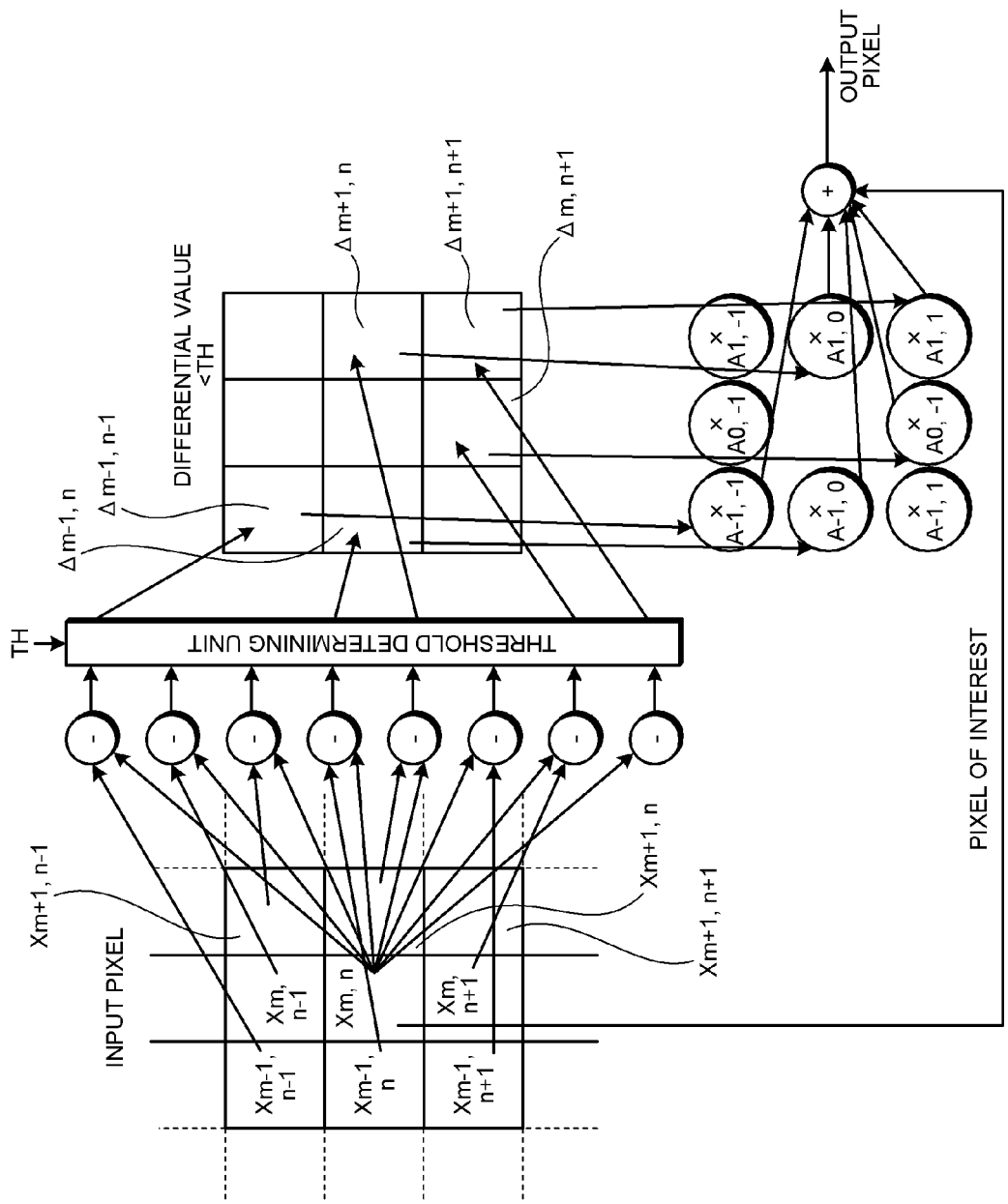
FIG. 8 is a diagram explaining the conventional technology.
Figure 9:
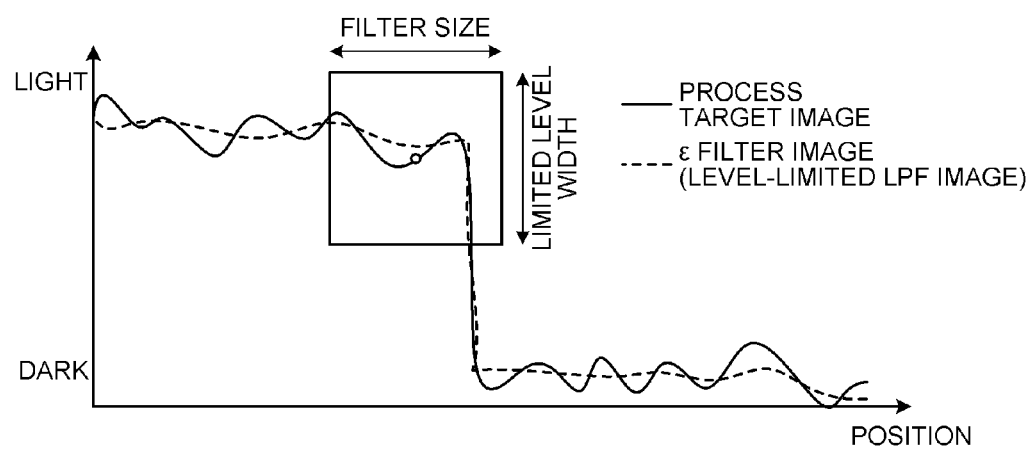
FIG. 9 is a diagram explaining the conventional technology.

FIG. 6 is a diagram illustrating an example of a computer system 100 that executes an image processing program. As illustrated in FIG. 6, the computer system 100 includes a RAM 101, an HDD 102, a ROM 103, and a CPU 104. In this case, the ROM 103 previously stores therein a program illustrating the same functions as those of the embodiments. In other words, as illustrated in FIG. 6, the ROM 103 previously stores a first smoothed image generating program 103a, a second smoothed image generating program 103b, a selection program 103c, and a synthesis processing program 103d.

The CPU 104 reads out and executes these programs 103a to 103d. As a result, as illustrated in FIG. 6, these programs respectively become a first smoothed image generating process 104a, a second smoothed image generating process 104b, a selection process 104c, and a synthesis processing process 104d. In this case, the first smoothed image generating process 104a corresponds to the filter processing unit A 34 illustrated in FIG. 2. Similarly, the second smoothed image generating process 104b corresponds to the filter processing unit B 35. The selection process 104c and the synthesis processing process 104d correspond to the synthesis processing unit 36. Moreover, the HDD 102 stores therein various types of information required for the process executed by the CPU.

However, the programs 103a to 103d are not necessarily stored in the ROM 103. For example, the programs 103a to 103d may be stored in a "transportable physical medium" such as a flexible disk (FD), a CD-ROM, a magnet-optical disk, a DVD disc, or an IC card that are inserted into the computer system 100, a "fixed physical medium" such as a hard disk drive (HDD) that is provided inside and outside the computer system 100, and further "another computer system" that is connected to the computer system 100 via a public line, Internet, LAN, WAN, or the like, so that the computer system 100 can read out and execute the programs from these media.

As described above, according to an aspect of the present invention, the image processing apparatus previously includes the plurality of low-pass filter groups that has different filter characteristics. The image processing apparatus can select and synthesize level-value-limited smoothed images that are obtained by using each filter characteristic on the basis of information (image information) other than a component that is a processing target in an input image. As a result, noise rejection intensity can be easily controlled at high speed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus for generating a smoothed image obtained by blurring an input image, the image processing apparatus comprising:
    a first smoothed image generating unit that sets pixels of the input image as process target pixels by using a plurality of low pass filters each having a plurality of different level value ranges, computes average values of the pixels included in the level value ranges from the pixels of the input image including process target pixels included within the filter sizes of the plurality of low pass filters, and generates a plurality of level-value-limited smoothed images limited by the plurality of level values;
    a second smoothed image generating unit that sets the pixels of the input image as process target pixels by using a plurality of low pass filters each having a plurality of level value ranges or filter sizes different from those of the first smoothed image generating unit, computes average values of the pixels included in the level value ranges from the pixels of the input image including process target pixels included within the filter sizes of the plurality of low pass filters, and generates a plurality of level-value-limited smoothed images limited by the plurality of level values;
    a selecting unit that selects one or more of the level-value-limited smoothed images generated by the first smoothed image generating unit or the second smoothed image generating unit on the basis of the process target pixels and level values different from the level values utilized by the first and second smoothed image generating units; and
    a synthesis processing unit that generates a smoothed image that uses values computed from level values of one or more of the pixels located at a position of the process target pixel or positions near the process target pixel in the one or more of the level-value-limited smoothed images selected by the selecting unit as the level values of the process target pixels.

2. The image processing apparatus according to claim 1, wherein the first smoothed image generating unit uses pixels of a reduced image obtained by reducing the input image as process target pixels by using the plurality of low pass filters each having the plurality of different level value ranges and generates the plurality of level-value-limited smoothed images, the second smoothed image generating unit uses the pixels of the reduced image obtained by reducing the input image as process target pixels by using the plurality of low pass filters each having the plurality of level value ranges or the filter sizes different from those of the first smoothed image generating unit and generates the plurality of level-value-limited smoothed images, and the synthesis processing unit expands the one or more of the level-value-limited smoothed images selected by the selecting unit to an original size of the input image and generates a smoothed image that uses values computed from level values of one or a plurality of pixels located at a position of the process target pixel or positions near the process target pixel in the selected level-value-limited smoothed images as the level values of the process target pixels with respect to the plurality of level-value-limited smoothed images by using a level value of a pixel, position information, and a level value different from a level value of a process target pixel.

3. The image processing apparatus according to claim 1, wherein the first smoothed image generating unit sets pixels of a color-difference component image consisting of color difference components of the input image as process target pixels by using a plurality of low pass filters each having level value ranges of a plurality of different color difference components and generates the plurality of level-value-limited smoothed images, the second smoothed image generating unit sets the pixels of the color-difference component image consisting of color difference components of the input image as process target pixels by using a plurality of low pass filters each having level value ranges of color difference components or filter sizes different from those of the first smoothed image generating unit and generates the plurality of level-value-limited smoothed images, and the selecting unit selects one or more of the level-value-limited smoothed images generated by the first smoothed image generating unit or the second smoothed image generating unit on the basis of the process target pixels and level values of brightness components different from the level values of the color difference components utilized by the first and second smoothed image generating units.

4. The image processing apparatus according to claim 1, wherein the first smoothed image generating unit sets pixels of a color-difference component image consisting of color difference components of the input image as process target pixels by using a plurality of low pass filters each having level value ranges of a plurality of different color difference components and generates the plurality of level-value-limited smoothed images, the second smoothed image generating unit sets the pixels of the color-difference component image consisting of color difference components of the input image as process target pixels by using a plurality of low pass filters each having level value ranges of color difference components or filter sizes different from those of the first smoothed image generating unit and generates the plurality of level-value-limited smoothed images, and the selecting unit selects one or more of the level-value-limited smoothed images generated by the first smoothed image generating unit or the second smoothed image generating unit on the basis of a corrected amount by which the input image is already processed as the process target pixels and the level values of the color difference components utilized by the first and second smoothed image generating units.

5. The image processing apparatus according to claim 1, wherein the first smoothed image generating unit sets pixels of a color-difference component image consisting of brightness components of the input image as process target pixels by using a plurality of low pass filters each having level value ranges of a plurality of different brightness components and generates the plurality of level-value-limited smoothed images, the second smoothed image generating unit sets the pixels of the brightness component image consisting of brightness components of the input image as process target pixels by using a plurality of low pass filters each having level value ranges of brightness components or filter sizes different from those of the first smoothed image generating unit and generates the plurality of level-value-limited smoothed images, and the selecting unit selects one or more of the level-value-limited smoothed images generated by the first smoothed image generating unit or the second smoothed image generating unit on the basis of a corrected amount by which the input image is already processed as the process target pixels and the level values of the brightness components utilized by the first and second smoothed image generating units.

6. A computer readable non-transitory storage medium having stored therein an image processing program for generating a smoothed image obtained by blurring an input image, the image processing program causing a computer to execute a process comprising:

setting pixels of the input image as process target pixels by using a plurality of first low pass filters each having a plurality of different level value ranges;

computing average values of the pixels included in the level value ranges from the pixels of the input image including process target pixels included within the filter sizes of the plurality of first low pass filters;

generating a plurality of level-value-limited smoothed images limited by the plurality of level values;

setting the pixels of the input image as process target pixels by using a plurality of second low pass filters each having a plurality of level value ranges or filter sizes different from those of the first low pass filters;

computing average values of the pixels included in the level value ranges from the pixels of the input image including process target pixels included within the filter sizes of the second low pass filters;

generating a plurality of level-value-limited smoothed images limited by the plurality of level values;

selecting one or more of the level-value-limited smoothed images generated for the first or the second low pass filters on the basis of the process target pixels and level values different from the level values utilized for the first and second low pass filters; and generating a smoothed image that uses values computed from level values of one or more of the pixels located at a position of the process target pixel or positions near the process target pixel in the selected one or more of the level-value-limited smoothed images as the level values of the process target pixels.

7. An image processing method of generating a smoothed image obtained by blurring an input image, the image processing method comprising:

setting pixels of the input image as process target pixels by using a plurality of first low pass filters each having a plurality of different level value ranges;

computing average values of the pixels included in the level value ranges from the pixels of the input image including process target pixels included within the filter sizes of the plurality of first low pass filters;

generating a plurality of level-value-limited smoothed images limited by the plurality of level values;

setting the pixels of the input image as process target pixels by using a plurality of second low pass filters each having a plurality of level value ranges or filter sizes different from those of the first low pass filters;

computing average values of the pixels included in the level value ranges from the pixels of the input image including process target pixels included within the filter sizes of the second low pass filters;

generating a plurality of level-value-limited smoothed images limited by the plurality of level values;

selecting one or more of the level-value-limited smoothed images generated for the first or the second low pass filters on the basis of the process target pixels and level values different from the level values utilized for the first and second low pass filters; and generating a smoothed image that uses values computed from level values of one or more of the pixels located at a position of the process target pixel or positions near the process target pixel in the selected one or more of the level-value-limited smoothed images as the level values of the process target pixels.

* * * * *